United States Patent [19]

Knott, Jr.

[11] Patent Number: 5,040,387
[45] Date of Patent: Aug. 20, 1991

[54] VEHICLE BRAKE LOCK ASSEMBLY

[75] Inventor: A. Paul Knott, Jr., Chicago, Ill.

[73] Assignee: Knott Lock Corporation, Chicago, Ill.

[21] Appl. No.: 599,844

[22] Filed: Oct. 18, 1990

[51] Int. Cl.$^5$ .................................... B60R 25/08
[52] U.S. Cl. ..................................... 70/202; 70/254; 70/256
[58] Field of Search ............. 70/254, 201–203, 70/253, 237, 256, 257, 206, 192, 193

[56] References Cited

U.S. PATENT DOCUMENTS

| | | | |
|---|---|---|---|
| 1,224,258 | 5/1917 | Becker | 70/202 |
| 1,325,178 | 12/1919 | Trembley | 70/202 |
| 1,344,554 | 6/1920 | Mentzer | 70/206 |
| 1,464,256 | 8/1923 | Calame | 70/201 |
| 1,560,582 | 11/1925 | Kagarise | 70/202 |
| 1,764,383 | 6/1930 | Bezek | 70/202 |
| 1,846,782 | 2/1932 | Ballamos | 70/257 |
| 2,471,293 | 5/1949 | Truesdell | 70/202 |
| 2,931,207 | 4/1960 | Fisher | 70/202 |
| 3,766,341 | 10/1973 | Guenther et al. | 70/257 X |
| 4,488,417 | 12/1984 | Werner | 70/253 |
| 4,903,510 | 2/1990 | Surles | 70/202 |

FOREIGN PATENT DOCUMENTS

| | | | |
|---|---|---|---|
| 086087 | 8/1983 | European Pat. Off. | |
| 509248 | 11/1920 | France | 70/254 |
| 1204059 | 8/1959 | France | 70/203 |

Primary Examiner—Lloyd A. Gall
Attorney, Agent, or Firm—Reising, Ethington, Barnard, Perry & Milton

[57] ABSTRACT

A vehicle antitheft assembly (10) for engaging a brake pedal (18) of a vehicle and locking the brakes of the vehicle in an activated position. The assembly (10) includes a U-shaped end portion (16) which engages the brake pedal (18) of the vehicle and a shaft portion (14) depending downwardly therefrom. The shaft portion (14) is telescopically received within a guiding sheath (27). The guiding sheath (27) is mounted through the floor board (24) of the vehicle by inserting the guiding sheath (27) through an aperture disposed in the floor board (24) and by clamping the floor board (24) from opposite sides between nut members (72) and a shoulder portion (76). The guiding sheath (27) extends above and below the nut members (72) and shoulder portion (76) to support the shaft portion (14) above and below the floor board (24). The shaft portion (14) includes locking holes (28) arranged along its length for receiving a dead bolt (30) for locking the U-shaped end (16) and brake pedal (18) in the brake activated position. The dead bolt (30) is operable at a remote location by way of an engagement button (42) and key operated cylinder (44), both connected to the bolt means (30) via a push/pull cable (34). Armor plating (46) protects the dead bolt (30), engagement button (42), and key operated cylinder (44) from tampering. A brake light cut-off is included to prevent brake light operation when the assembly (10) is locked in the activated position. Finally, a starter interrupt is provided to prevent the vehicle from being started when the assembly (10) is locked in the brake activated position.

21 Claims, 2 Drawing Sheets

5,040,387

VEHICLE BRAKE LOCK ASSEMBLY

BACKGROUND OF THE INVENTION

1. Technical Field

The present invention generally relates to a vehicle antitheft assembly. More specifically, the subject invention relates to a vehicle antitheft assembly for locking a brake pedal of a vehicle in a brake activated position. The assembly includes a brake pedal engaging means for engaging the brake pedal and which is movable between brake activated and non-activated positions.

2. Background Art

Antitheft devices for use with vehicles have become increasingly popular due to the rise in vehicle theft. One common type of antitheft device employs a hook member for restricting the movement of an operating member of the vehicle, such as a clutch pedal, steering wheel, or the like. Examples of such designs are shown in U.S. Pat. Nos. 4,488,417 to Werner, issued Dec. 18, 1984. 1,464,256 to Calame, issued on Aug. 7, 1923; and European Patent Application No. 833300544.0, filed on Feb. 3, 1983, published Aug. 17, 1983 with priority date Feb. 8, 1982.

A particularly useful type of antitheft design employs a hook member for engaging the brake pedal of a vehicle. The hook member often includes a shaft portion depending therefrom which is telescopically received within a guide sleeve. The guide sleeve guides the hook within and shaft portion between brake activated and non-activated positions. The shaft portion is capable of being locked in the brake activated position, thereby locking the brake pedal in the brake activated position. With such designs, it has been found particularly advantageous to position the hook member perpendicular to the brake pedal, that is, aligned with the movement of the brake pedal between brake activated and non-activated positions. This maximizes the strength of the assembly when the hook and brake pedal are locked in the brake activated position. Also, it has been found advantageous to extend the shaft portion through the floor board of the vehicle. By positioning the shaft in this manner, the shaft remains guided by the guide sleeve throughout its entire movement between brake activated and non-activated positions.

An example of such a device is disclosed in U.S. Pat. No. 4,903,510 to Surles. The Surles '510 patent discloses an antitheft device including a brake engaging member having a hook member for engaging the brake pedal of the vehicle and further includes a shaft portion. The shaft portion extends below the floor board of the vehicle and is telescopically received within a locking sleeve. The shaft includes locking holes therethrough for receiving a locking member. The locking member engages the locking holes of the shaft below the floor board of the vehicle for locking the vehicle's brakes in an activated position.

When the brake engaging member is not locked, that is, when the locking member is not within the locking holes of the shaft, it is desirable to leave the hook member engaged about the brake pedal and the shaft portion disposed within the sleeve. Leaving the brake engaging member engaged reduces the time required to lock the device and contributes to the overall convenience of the assembly.

Unfortunately, normal operation of the brake pedal is hindered when the brake engaging member of the Surles '510 patent is left engaged about the brake pedal and within the sleeve. As a result of insufficient support between the shaft portion and the sleeve, the brake engaging member "lodges" or "jams" within the sleeve and the brake pedal. This "lodging" of the brake engaging member results in dangerously obstructed brake use. Consequently, the brake engaging member must be disengaged from the brake pedal when not locked in the brake activated position.

SUMMARY OF THE INVENTION AND ADVANTAGES

The present invention is directed toward a vehicle antitheft assembly including a brake pedal engaging means for engaging a brake pedal of a vehicle and for moving between a brake activated position and non-activated position. The assembly further includes locking means for locking the pedal engaging means in the brake activated position. A guide means, telescopically disposed about the brake pedal engaging means, is included for guiding the brake pedal engaging means through a floor board of the vehicle. Mounting means are included for mounting the guide means through the floor board of the vehicle. The antitheft assembly is characterized by the guide means extending above and below the mounting means for supporting the brake pedal engaging means above and below the floor board of the vehicle. An advantage of extending the guide means above and below the mounting means is appreciated by greater support of the brake pedal engaging means above and below the floor board of the vehicle. This results in additional support and smoother operation between the brake pedal engaging means and the guide means. This advantage is further appreciated by allowing the brake pedal engaging means to remain engaged with the brake pedal and guide means regardless of whether the assembly is in the brake activated or non-activated position. Consequently, normal brake operation is unhindered by the engagement of the brake engaging means. Thus, the brake engaging means need never be disengaged from the brake pedal or guide means.

FIGURES IN THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
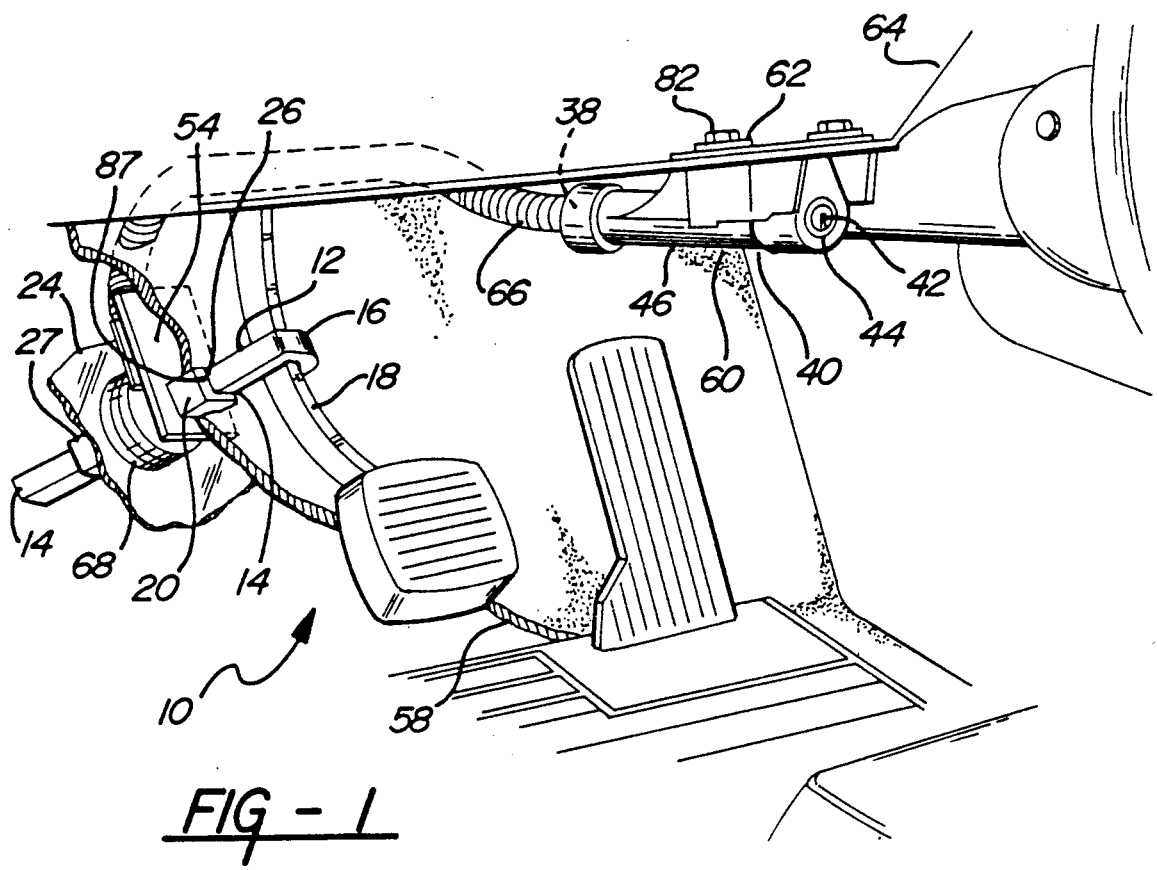
FIG. 1 is a perspective view of the preferred embodiment of the subject assembly installed in a vehicle.

A vehicle antitheft assembly for locking the brakes of a vehicle in a brake activated position is generally shown at 10 in FIG. 1. The assembly includes a brake pedal engaging means 12 including a shaft portion 14 and a U-shaped end portion 16. The U-shaped end portion 16 engages a brake pedal 18 by acting as a hook thereabout and may be disengaged therefrom by simply "unhooking" the end portion 16 from the brake pedal 18. The shaft portion 14 extends from the U-shaped end 16 and is telescopically received within guide means 20. The pedal engaging means 12 is movable between brake activated (shown in FIG. 4) and non-activated (shown in FIG. 3) positions and may be locked in the brake activated position by locking means 22 described below. The guide means 20 is mounted through a floor board 24 of a vehicle by mounting means 68, described below. The guide means 20 is approximately half as long as the shaft portion 14 and extends a substantially equally distance above and below the mounting means 68 to support the brake pedal engaging means 12 above and below the floor board 24 of the vehicle. The guide means 20 includes a guiding sheath 27 which telescopically receives the shaft portion 14 and guides the movement of the pedal engaging means 12 between brake activated and non-activated positions. A precluding means 26 is positioned between the shaft portion 14 and the guiding sheath 27 for precluding rotation therebetween. The precluding means 26 comprises the shaft portion 14 and guiding sheath 27 having complimentary cross sections so that when the shaft portion 14 is telescopically received within the guiding sheath 27, relative rotation therebetween is precluded. More specifically, the shaft portion 14 maintains a rectangular cross-section and the guiding sheath 27 maintains a slightly larger rectangular cross section. It will be appreciated, however, that any complimentary pair of cross-sections which preclude relative rotation therebetween can by used e.g., oblong elliptical or polygonal cross-sections.

Figure 3:
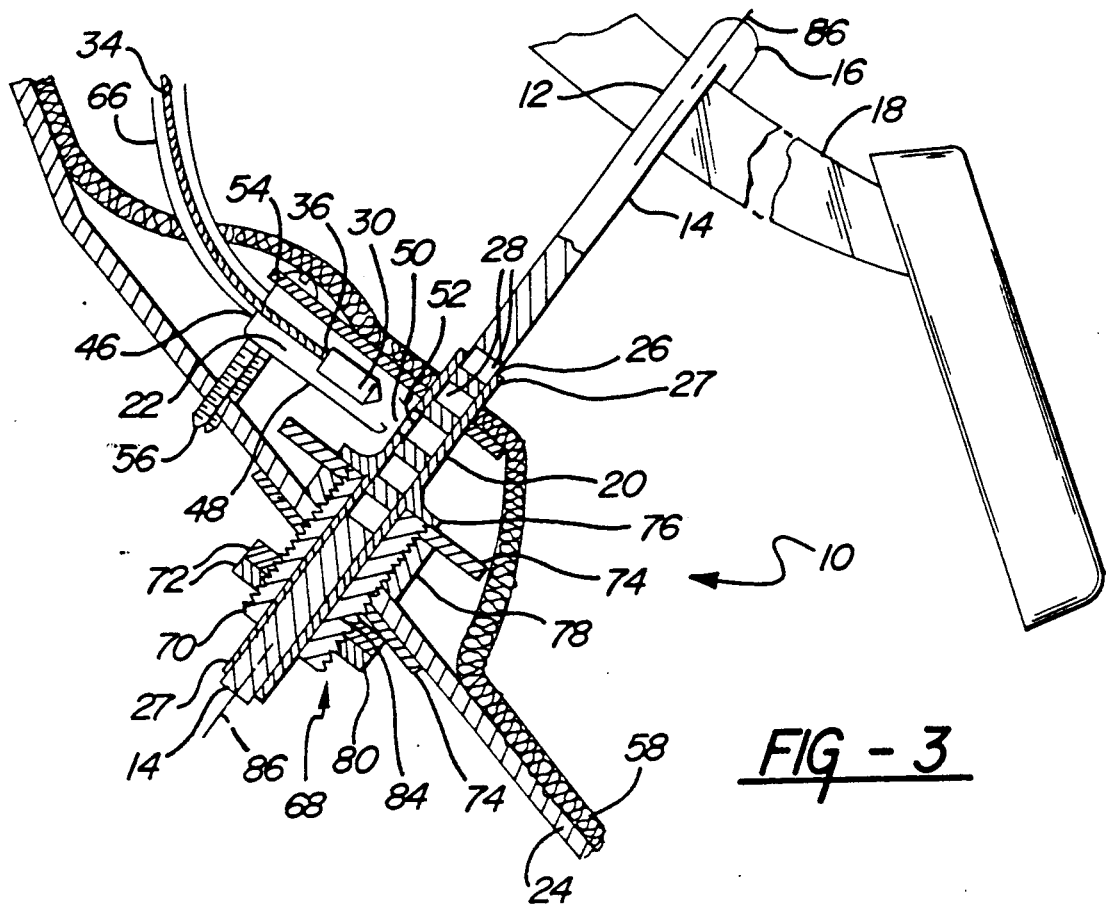
FIG. 3 is a partially cut away side view of the preferred embodiment of the subject assembly installed in a vehicle in the non-activated position.
Figure 4:
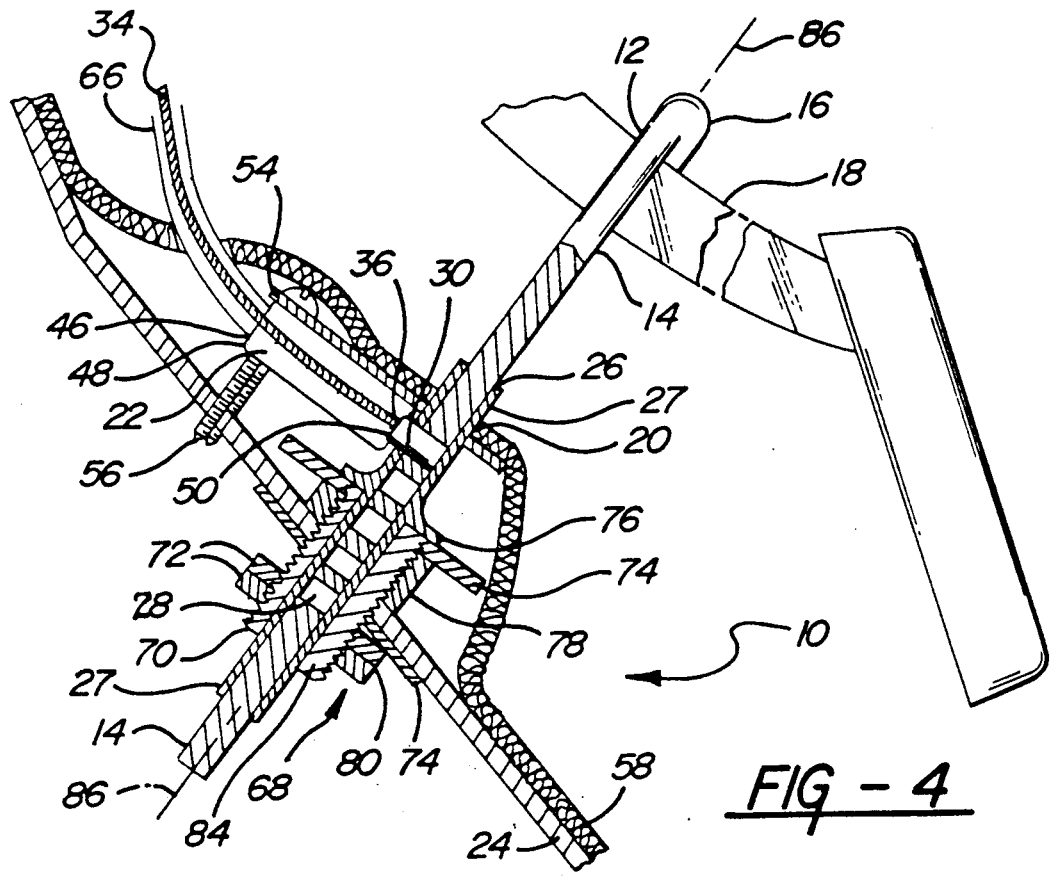
FIG. 4 is a partially cut away side view of the preferred embodiment of the subject assembly installed in a vehicle locked in the brake activated position.

The assembly includes locking means 22 for locking the brakes of the vehicle in the brake activated position, best shown in FIGS. 3 and 4. The shaft portion 14 includes a plurality of locking holes 28 disposed along its length. Additionally, the guide means 20 includes a guide aperture 52 disposed therethrough such that when the shaft portion 14 is telescopically moved within the guide sheath 27 from a non-activated to a brake activated position, one of the locking holes 28 align with the guide aperture 52. The locking means 22 includes a bolt means 30 engagable with the guide aperture 52 and one of the locking holes 28 for selectively locking the shaft portion 14 with respect to the guide means 20. The bolt means 30 is preferably a dead bolt, or the like. A push/pull cable 34 having a first end 36 operatively connected to the bolt means 30 is included for moving the bolt means 30 in and out of locking engagement with the guide aperture 52 and locking holes 28. A second end 38 of the push/pull cable 34 is operatively connected to an actuator means 40, shown in FIG. 1, for actuating movement of the push/pull cable 34 and correspondingly, the locking engagement of the bolt means 30 with the guide aperture 52 and locking holes 28. The actuator means 40 includes a spring biased engagement button 42. When the engagement button 42 is depressed against a spring biasing force, the button 42 locks into a depressed position, as shown in FIG. 1. When the button 42 is being depressed, the push/pull cable 34 translates the depression force to engage the bolt means 30 with the locking holes 28. The actuator means 40 also includes a key operated cylinder 44 for unlocking the engagement button 42 from the depressed, locked position. To unlock the actuator means 40, a key is inserted into the cylinder 44 and turned thereby unlocking the engagement button 42. Once the button 42 is unlocked, it is spring biased out of the depressed position, thereby disengaging the bolt means 30 from the guide aperture 52 and locking holes 28 via the push/pull cable 34.

The assembly also includes armor plating means 46 for providing an armor enclosure for the locking means 22. Specifically, the armor plating means 46 includes an end cap 48 for enclosing the first end 36 of the push/pull cable 34 and bolt means 30. The end cap 48, best shown in FIG. 3, includes a guide hole 50 therethrough adjacent the guide aperture 52 for allowing the bolt means 30 to pass therethrough to engage the locking holes 28 disposed along the shaft portion 14.

A mounting plate 54 is secured to the end cap 48 and the guide means 20 by fasteners, such as rivets (not shown) and provides support for the end cap 48. Alternatively, the mounting plate 54 may be welded to the end cap 48 and guide means 20. The mounting plate 54 is in turn mounted to the floor board 24 of the vehicle by bolts 56 and may be mounted underneath a floor board covering 58 e.g. carpeting, car mat, etc. The armor plating means 46 additionally includes a control head 60, shown in FIG. 1, for enclosing the second end 38 of the push/pull cable 34 and the key operated cylinder 44. The control head 60 also includes fastening means 62, preferably a bolt and nut assembly, for securing the control head 60 to the vehicle, preferably to the dash board 64 or other conveniently accessible location. Finally, the armor plating means 46 includes a conduit 66 extending about the portion of the push/pull cable 34 between the end cap 48 and the control head 60 for protecting and guiding the push/pull cable 34.

Vehicles with brake lights generally include a brake indicator switch which detects when the brake pedal 18 has been depressed and correspondingly allows electrical current to pass to the brake lights for illumination. Generally, a vehicle's brake indicator switch is supplied with a "hot" power supply, that is, the power supply to the brake indicator switch is continuous regardless of whether the vehicle's power is turned off. Therefore, if the brake pedal is left in the activated position, the brake indicator lights will continue to draw power from the vehicle's battery after the vehicle is off. The assembly employs brake light cut-off means (not shown) for turning off the brake indicator lights when the assembly is in the brake activated position and the vehicle's power is turned off. The cut-off means protects the vehicle's battery from discharging in the above situation. More specifically, the cut-off means includes terminating the "hot" power supply to the brake indicator switch and substituting a power supply which is active only when the ignition switch of the vehicle is "on". This can by accomplished by re-routing the power supply from a "hot" power source to one that requires the ignition of the vehicle to be "on" before electrical current flows therethrough. A starter interrupt means (not shown) is employed for interrupting the power supply to an engine starter when the assembly is locked in the brake activated position. The starter interrupt means includes an electrical grounding means and a power interrupt switch to achieve this end. The electrical grounding means selectively "grounds" the assembly 10 when the assembly is locked in the brake activated position and alternately "un-grounds" the assembly 10 when in the non-activated position. The power interrupt switch interrupts the power supply to the starter by electrically connecting the starter and the assembly 10 to the starter power supply in a parallel fashion. Thus, when the assembly is in the non-activated position, electrical power is directed through the power interrupt switch to the starter. However, when the assembly is locked in the brake activated position, electrical power flows through the power interrupt switch directly to the assembly 10 due to its direct electrical ground. Thus, when the assembly 10 is locked in the brake activated position, the vehicle can not be re-started without unlocking the assembly 10.

The assembly 10 is mounted though the floor board 24 of the vehicle by a mounting means 68. The mounting means 68, best shown in FIGS. 2, 3, and 4, includes a shoulder portion 76 extending from the guide means 20, preferably circumferentially about the guiding sheath 27. The mounting means 68 also includes a clamping means 80 engagable with the guide means 20 for clamping the floor board 24 against the shoulder portion 76 and for mounting the guide means 20 through the floor board 24 of the vehicle. The guide means 20 includes threads 70 disposed circumferencely about the guiding sheath 27, adjacent to the shoulder portion 76. The clamping means 80, namely a nut member 72 (preferably two nut members 72), is threadably engagable about the threads 70 for clamping the floor board 24 between the nut member 72 and the shoulder portion 76. The mounting means 68 also includes washer members 74 for mounting the guide means 20 through the floor board 24. The threads 70 ideally comprise a circular sleeve 84 having threads 70 circumferencely disposed thereabout. The sleeve 84 is disposed about a portion of the guiding sheath 27, adjacent to the shoulder portion 76, and welded thereabout. It will be appreciated to those skilled in the art that the threads 70 may be integrally threaded about the outer surface of the guiding sheath 27. The shoulder portion 76 is preferably integral about the guiding sheath 27 but may alternatively be independent from the guiding sheath 27 and welded or otherwise attached thereto. The mounting means 68 may additionally include a spacer 78 for establishing an operating axis 86 for the guide means 20. The spacer 78 and operating axis 86 will be discussed in more detail below.

Figure 2:
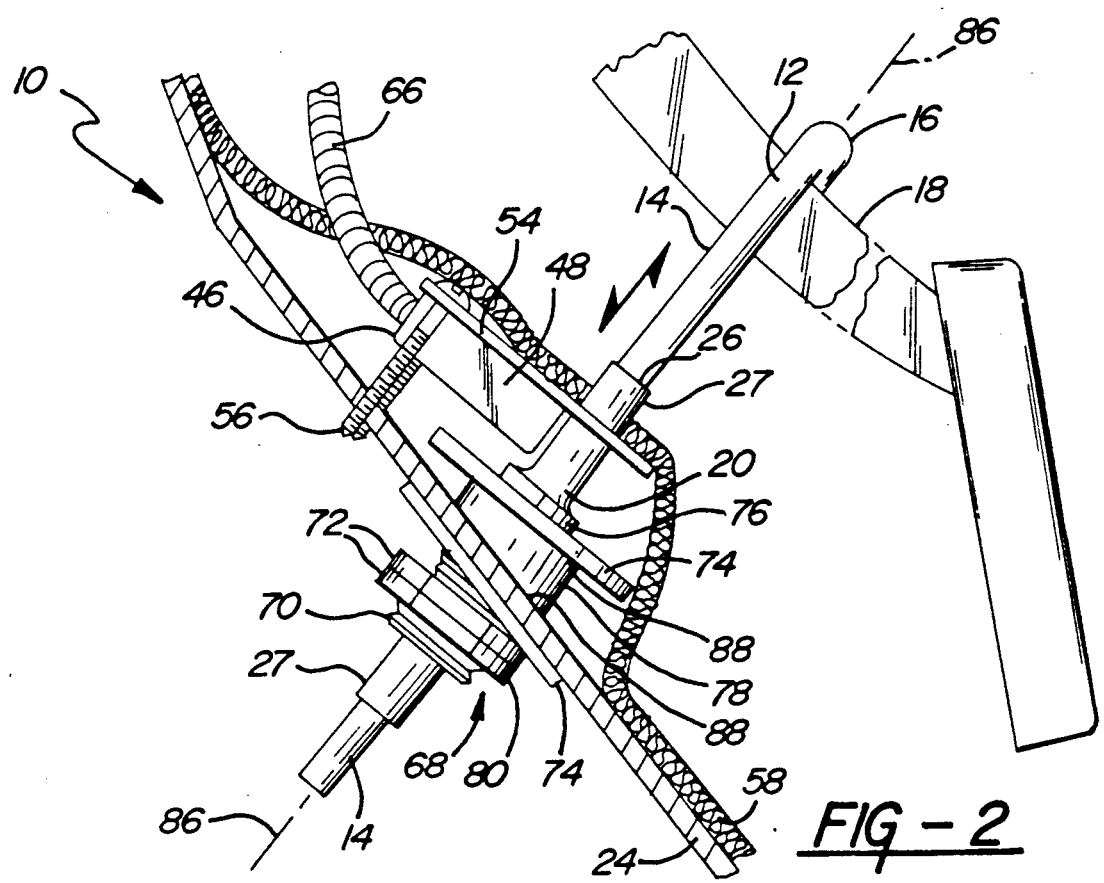
FIG. 2 is a side view of the preferred embodiment of the subject assembly installed in a vehicle.

Installation of the assembly requires an aperture to be drilled through the floor board 24 of the vehicle. The aperture must be slightly larger in circumference than the threads 70 and aligned below the brake pedal 18. Preferably, in a vehicle having a floor board 24 generally perpendicular to the movement of the brake pedal 18 (not shown in the FIGURES), the guide means 20 is inserted through the aperture from the inside of the vehicle until the shoulder portion 76 reacts against the floor board 24. The nut members 72 are threadably tightened about the threads 70 so as to tighten the shoulder portion 76 and nut members 72 to react against the floor board 24 from opposite sides, thereby securing the guide means 20 through the floor board 24. Washer members 74 are preferably used between the shoulder portion 76 and the floor board 24 and between the nut members 72 and the floor board 24. Ideally, the guiding means 20 is positioned perpendicularly to the brake pedal 18 thereby forming an operating axis 86. However, in a vehicle not having a floor board 24 generally perpendicular to the movement of the brake pedal 18, as shown in FIGS. 2-4, a spacer 78 may be preferred to achieve a more perpendicular angle between the brake pedal 18 and the guide means 20. The spacer 78, shown best in FIG. 2, is circumferencely disposed about the threads 70, adjacent the shoulder portion 76. Ideally a washer member 74 separates the spacer 78 from the shoulder portion 76. The spacer 78 includes non-parallel extremities 88 for establishing the operating axis 86 at an angle other than perpendicular to the floor board 24. If, however, the floor board 24 is substantially perpendicular to the operating axis 86, the spacer 78 is unnecessary. The mounting plate 54 is bolted to the floor board 24 adjacent to the aperture as shown in FIG. 1. The control head 60 is fastening to the vehicle through any fastening means 62, preferably mounting bolts 82. Ideally, the control head 60 is mounted to the dashboard 64 or other conveniently accessible location. Finally, the brake light cut-off means and starter interrupt means are installed as described above.

In operation, the U-shaped end portion 16 of the brake engaging means 12 is placed over the brake pedal 18. The shaft portion 14 is then moved into the guiding sheath 27 directly below the brake pedal 18. The brake pedal 18 and the U-shaped end portion 16 are moved in response to a manual force applied to the brake pedal 18. As the brake pedal 18 is moved to the brake activated position, that is, as one of the locking holes 28 aligns with the guide aperture 52, the engagement button 42 is depressed. Depression of the engagement button 42 causes the push/pull cable 34 to advance the bolt means 30 through the guide hole 50, guide aperture 52, and into one of the locking holes 28 disposed along the shaft portion 14 of the brake engagement means 12. This prevents longitudinal movement of the U-shaped end portion 16 thereby locking the brake pedal 18 in the activated position. As the assembly 10 is being locked in the brake activated position, the electrical grounding means "grounds" the assembly 10, thereby preventing the vehicle from being re-started with the assembly 10 locked in the brake activated position.

To restore normal operation of the brake, a key is inserted in the key operated cylinder 44 and turned. This unlocks the engagement button 42 which is spring biased out of the depressed position and moves the bolt means 30 out of engagement with the locking holes 28. The U-shaped end portion 16 may be left engaged with the brake pedal 18 and the shaft portion 14 within the guiding sheath 27 without hindering normal brake operation.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A vehicle antitheft assembly comprising:
   brake pedal engaging means (12) for engaging a brake pedal (18) and for moving between a brake activated position and non-activated position;
   locking means (22) for locking said pedal engaging means (12) in the brake activated position;
   guide means (20) telescopically disposed about said brake pedal engaging means (12) for guiding said brake pedal engaging means (12) through a floor board (24) of a vehicle;
   mounting means (68) for mounting said guide means (20) through the floor board (24) of the vehicle;

said assembly characterized by said guide means (20) being telescopically disposed about said brake pedal engaging means (12) at locations above and below said mounting means (68) to telescopically support said brake pedal engaging means (12) above and below the floor board (24) of the vehicle.

2. The antitheft assembly of claim 1 wherein said mounting means (68) includes a shoulder portion (76) extending from said guide means (20) and further characterized by said mounting means (68) including a clamping means (80) engageable with said guide means (20) for fixedly securing said shoulder portion (76) relative to the floor board (24) of the vehicle.

3. The antitheft assembly of claim 2 wherein said guide means (20) include threads (70) adjacent said shoulder portion (76) and further characterized by said clamping means (80) including a nut member (72) threadably engagable about said threads (70) for clamping the floor board (24) of the vehicle between said nut member (72) and said shoulder portion (76).

4. The antitheft assembly of claim 3 further characterized by said mounting means (68) including washer members (74) for mounting said guide means (20) through the floor board (24) of the vehicle.

5. The antitheft assembly of claim 2 further characterized by said mounting means (68) including a spacer (78) for establishing an operating axis 86 for said guide means (20).

6. The antitheft assembly of claim 5 further characterized by said spacer (78) having non-parallel extremities (88) for establishing said operating axis (86) of said guide means (20) at an angle other than perpendicular to the floor board (24).

7. The antitheft assembly of claim 2 wherein said guide means (20) includes a guiding sheath (27) and said brake pedal engagement means (12) includes a shaft portion (14), said shaft portion (14) telescopically disposed within said guiding sheath (27) and further characterized by including precluding means (26) for precluding rotation between said shaft portion (14) and said guiding sheath (27).

8. The antitheft assembly of claim 7 wherein said precluding means (26) includes said shaft portion (14) and said guiding sheath (27) having complementary cross sections for precluding rotation therebetween.

9. The antitheft assembly of claim 8 further characterized by said complimentary cross sections being polygonally shaped for precluding rotation between said shaft portion (14) and said guiding sheath (27).

10. The antitheft assembly of claim 9 wherein said shaft portion (14) includes a plurality of locking holes (28) disposed therein and said guide means (20) includes a guide aperture (52) disposed therethrough, said assembly further characterized by said locking means (22) including a bolt means (30) engagable with said guide aperture (52) and said locking holes (28) for selectively locking said shaft portion (14) with respect to said guide means (20).

11. The antitheft assembly of claim 10 further characterized by said assembly including a push/pull cable (34) having a first end (36) operatively connected to said bolt means (30) for moving said bolt means (30) in and out of locking engagement with one of said locking holes (28) and said guide aperture (52).

12. The antitheft assembly of claim 11 wherein said locking means (22) includes an actuator means (40) and further characterized by said push/pull cable (34) including a second end (38) operatively connected to said actuator means (40) for communicating actuation from said actuator means (40) to said bolt means (30).

13. The antitheft assembly of claim 12 wherein said actuator means (40) includes an engagement button (42) for engaging said bolt means (30) with said locking holes (28) and said guide aperture (52) and further characterized by including a key operated cylinder (44) for disengaging said bolt means (30) from said locking holes (28) and said guide aperture (52).

14. The antitheft assembly of claim 13 further characterized by including armor plating means (46) for providing an armor enclosure for said locking means (22).

15. The antitheft assembly of claim 14 further characterized by said armor plating means (46) including an end cap (48) for enclosing said first end (36) of said push/pull cable (34) and said bolt means (30).

16. The antitheft assembly of claim 15 wherein said end cap (48) includes a guide hole (50) and further characterized by said guide hole (50) being adjacent said guide aperture (52) for said bolt means (30) to pass therethrough for engaging said locking holes (28).

17. The antitheft assembly of claim 16 further characterized by including a mounting plate (54) secured to said end cap (48) and said guiding means (20) for supporting said end cap (48) and further including bolts (56) for mounting said mounting plate (54) to the floor board (24) of a vehicle.

18. The antitheft assembly of claim 17 wherein said armor plating means (46) includes a control head (60) for enclosing said second end (38) of said push/pull cable (34) and said actuator means (40) and further characterized by said control head (60) including fastening means (62) for fastening said control head (60) to the vehicle.

19. The antitheft assembly of claim 18 further characterized by said armor plating means (46) including a conduit (66) extending about a portion of said push/pull cable (34) between said end cap (48) and said control head (60).

20. The antitheft assembly of claim 2 further characterized by said pedal engaging means (12) including a U-shaped end portion (16) for engaging a brake pedal (18) of a vehicle.

21. A vehicle antitheft assembly comprising:
a floor board (24);
a brake pedal (18);
brake pedal engaging means (12) for engaging said brake pedal (18) and for moving between a brake activated position and non-activated position;
guide means (20) telescopically disposed about said brake pedal engaging means (12) for guiding said brake pedal engaging means (12) through said floor board (24) of a vehicle;
locking means (22) for locking said pedal engaging means (12) in the brake activated position;
a shoulder portion (76) extending from said guide means (20);
a clamping means (80) engageable with said guide means (20) for fixedly securing said shoulder portion (76) relative to said floor board (24) of the vehicle;
said assembly characterized by said guide means (20) being telescopically disposed about said brake pedal engaging means (12) at locations above and below said shoulder portion (76) to support said brake pedal engaging means (12) above and below said floor board (24) of the vehicle.

* * * * *